US011857993B2

(12) United States Patent
Lim

(10) Patent No.: US 11,857,993 B2
(45) Date of Patent: Jan. 2, 2024

(54) VIBRATION NOZZLE FOR BIDET

(71) Applicant: Young Kyoun Lim, Incheon (KR)

(72) Inventor: Young Kyoun Lim, Incheon (KR)

(73) Assignee: Young Kyoun Lim, Incheon (KR)

( * ) Notice: Subject to any disclaimer, the term of this patent is extended or adjusted under 35 U.S.C. 154(b) by 734 days.

(21) Appl. No.: 17/045,741

(22) PCT Filed: Jan. 29, 2019

(86) PCT No.: PCT/KR2019/001199
§ 371 (c)(1),
(2) Date: Oct. 6, 2020

(87) PCT Pub. No.: WO2019/198920
PCT Pub. Date: Oct. 17, 2019

(65) Prior Publication Data

US 2021/0023580 A1 Jan. 28, 2021

(30) Foreign Application Priority Data

Apr. 11, 2018 (KR) ........................ 10-2018-0041928

(51) Int. Cl.
*B05B 17/06* (2006.01)
*E03D 9/08* (2006.01)

(52) U.S. Cl.
CPC ............ *B05B 17/0623* (2013.01); *E03D 9/08* (2013.01)

(58) Field of Classification Search
CPC . B05B 17/0623; B05B 17/06; B05B 17/0607; E03D 9/08
See application file for complete search history.

(56) References Cited

FOREIGN PATENT DOCUMENTS

| | | | | | |
|---|---|---|---|---|---|
| JP | 2778239 | B2 | | 7/1998 | |
| JP | 2001-081833 | A | | 3/2001 | |
| JP | 2015055031 | A | * | 3/2015 | ............... E03D 9/08 |
| KR | 20-0355415 | Y1 | | 7/2004 | |
| KR | 10-2009-0123283 | A | | 12/2009 | |
| KR | 20-2010-0003039 | U | | 3/2010 | |
| KR | 20110001352 | A | * | 3/2015 | ............. A61L 2/025 |

* cited by examiner

*Primary Examiner* — Steven M Cernoch
(74) *Attorney, Agent, or Firm* — Goldilocks Zone IP Law

(57) ABSTRACT

Proposed is a vibration nozzle for a bidet, having a nozzle tip and a vibration motor that are formed to be separate such that the nozzle tip has maximized vibration efficiency so as to allow clean washing, the nozzle tip is coupled only to a part of the inside of the front end of a nozzle so as to be reduced in size, thereby having reduced manufacturing costs, and washing water supply pipes connected to the nozzle tip are arranged at both sides of the shaft of the vibration motor such that the diameter of the nozzle can be minimized and a structure for forming a separate water channel is unnecessary, and thus manufacturing costs can be reduced.

5 Claims, 4 Drawing Sheets

[FIG.1]
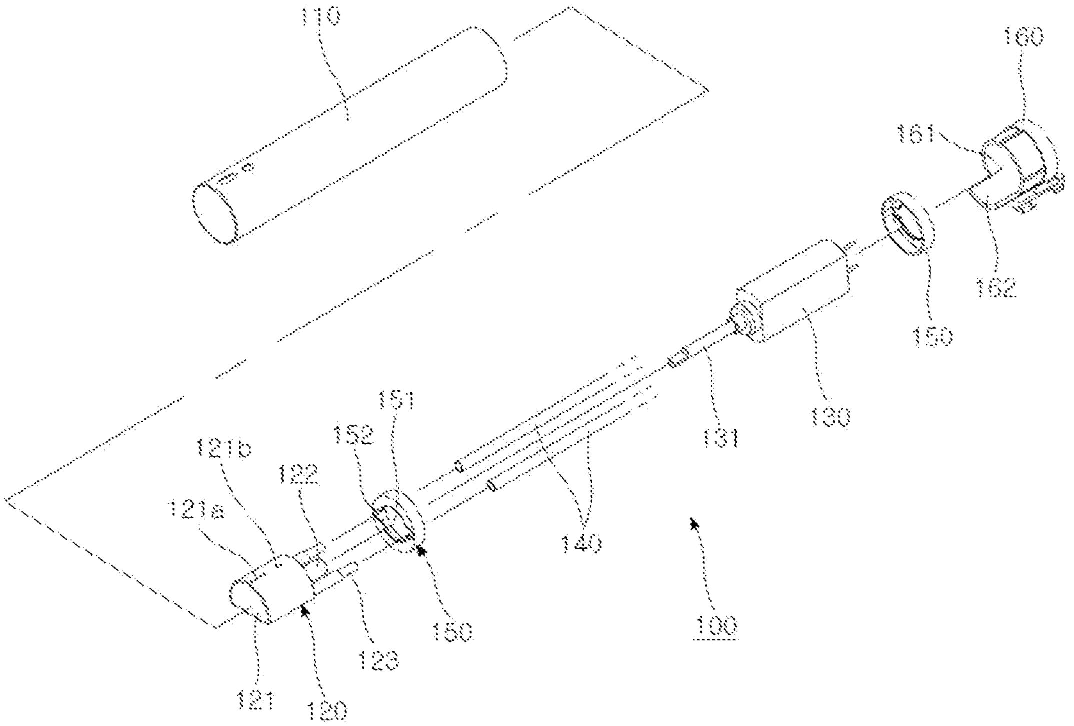

[FIG.2]
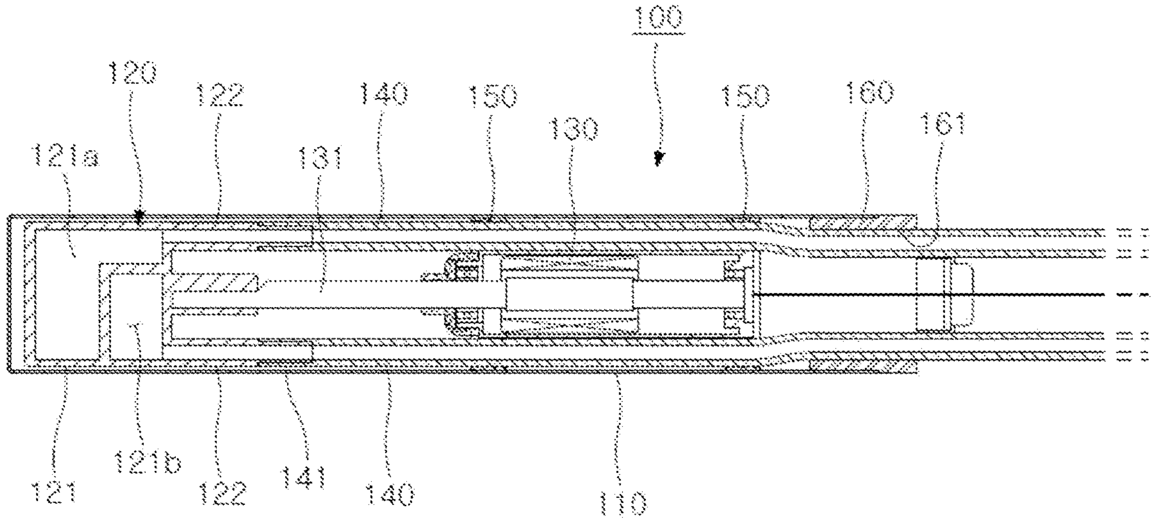
[FIG.3]
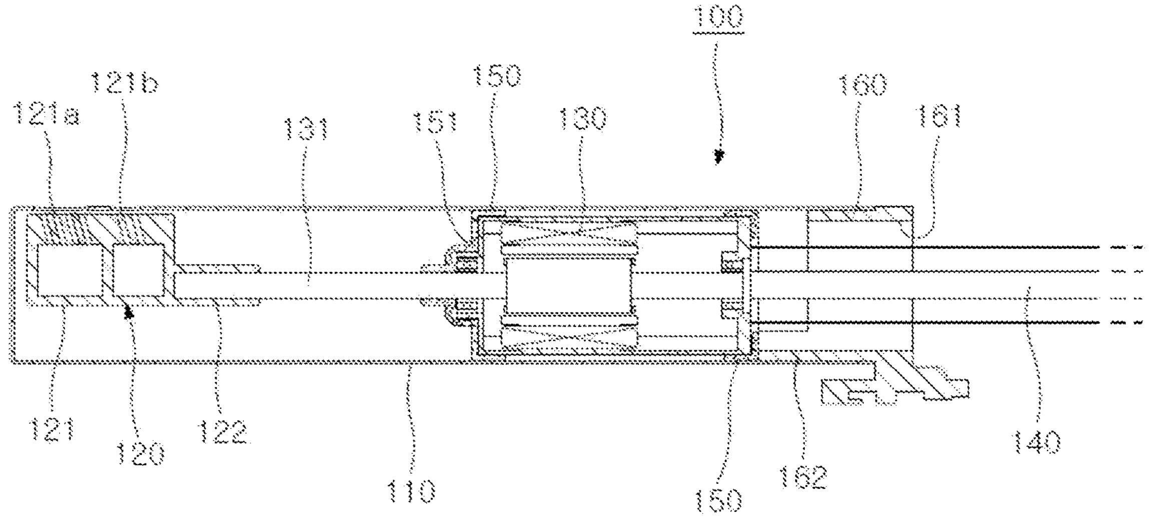

[FIG.4]
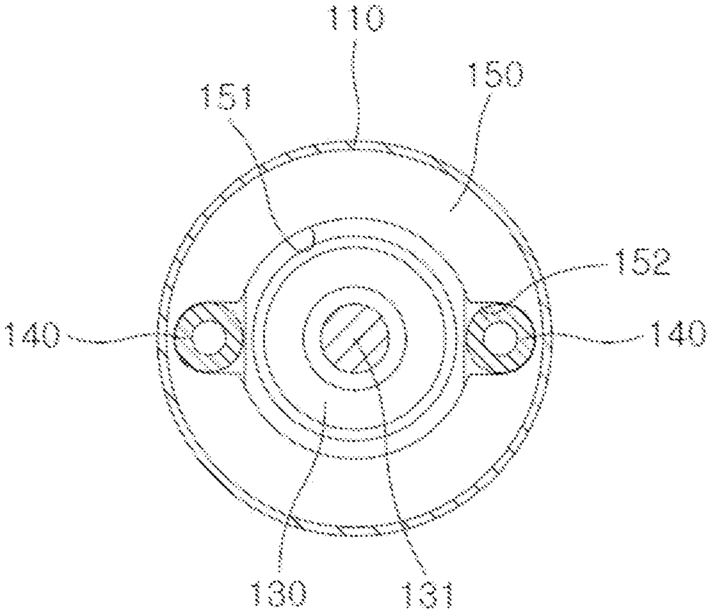

[FIG.5]
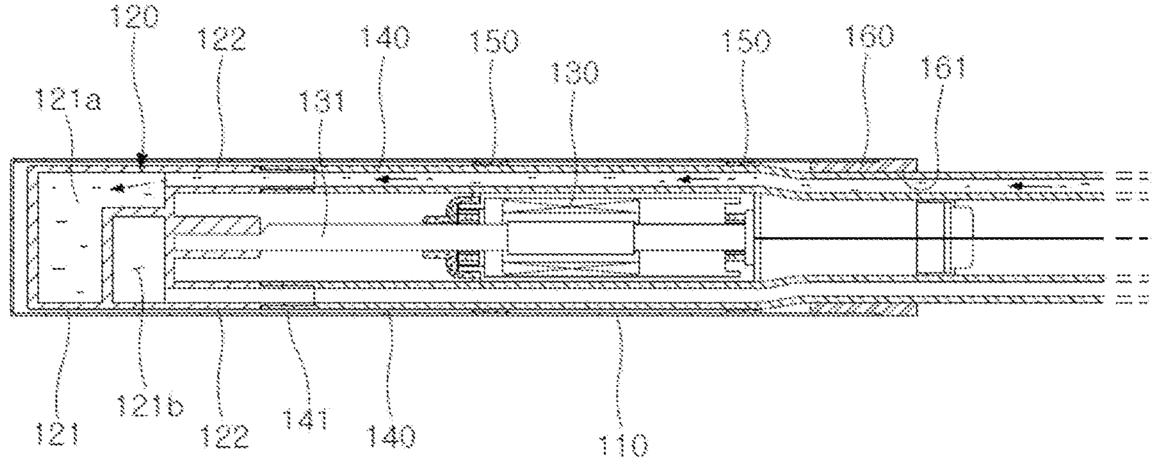
[FIG.6]
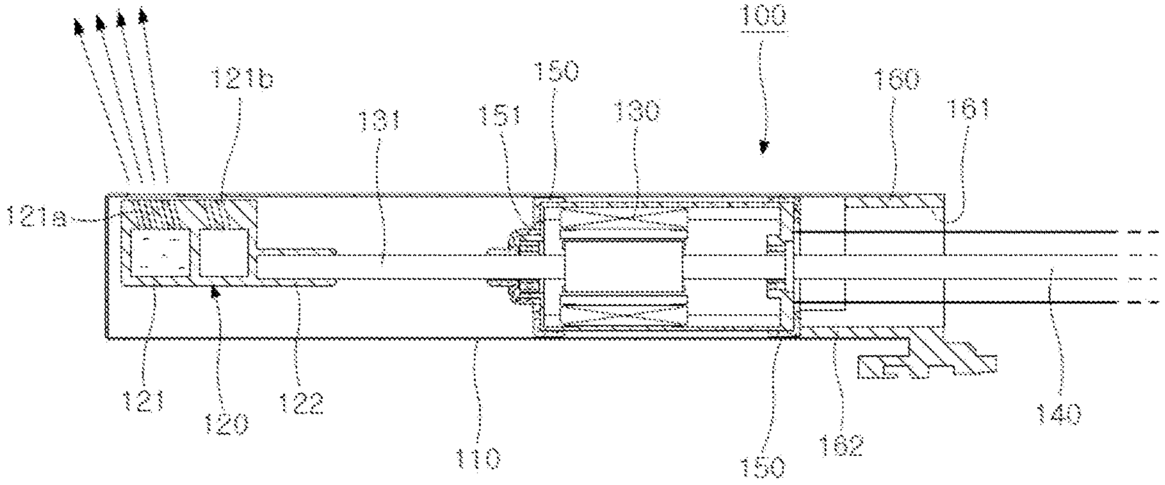

VIBRATION NOZZLE FOR BIDET

CROSS-REFERENCE TO RELATED APPLICATIONS

This application claims the benefit under 35 U.S.C. section 371, of PCT International Application No.: PCT/KR2019/001199, filed on Jan. 29, 2019, which claims foreign priority to Korean Patent Application No.: 10-2018-0041928, filed on Apr. 11, 2018, in the Korean Intellectual Property Office, both of which are hereby incorporated by reference in their entireties.

TECHNICAL FIELD

The present disclosure relates to a vibration nozzle for a bidet. More particularly, the present disclosure relates to a vibration nozzle for a bidet, in which a nozzle tip and a vibration motor are formed to be separate such that the nozzle tip has maximized vibration efficiency so as to allow clean washing, the nozzle tip is coupled only to a part of the inside of the front end of a nozzle cover so as to be reduced in size thereby reducing manufacturing costs, and washing-water supply tubes connected to the nozzle tip are arranged at both sides of a shaft of the vibration motor such that the diameter of the nozzle can be minimized and a structure for forming a separate water channel is unnecessary, thus reducing manufacturing costs.

BACKGROUND ART

Generally, a bidet is installed on a toilet to wash the anus and genitals of a human body. The bidet performs an anus washing operation of washing the anus without tissue with washing water that is discharged through a nozzle after using the toilet, a genital washing operation of washing women's genitals with the washing water, and a massage washing operation of achieving massage effects by continuously and repeatedly moving the nozzle that discharges washing water forwards and backwards.

However, the nozzle provided to be used for washing is problematic in that washing water discharged through a washing-water tank in the bidet is directly discharged through a wash hole, so that a part to be washed may not be effectively washed.

In order to solve the problem, Korean U.M. Registration No. 20-0411530 related to a discharge tip structure of a bidet nozzle has been proposed.

The discharge tip structure of the bidet nozzle that has been pre-registered may discharge washing water by repeating the operation of opening and closing the wash hole while a rotary member is rotated by the washing water supplied from a bidet tank, thus reducing the amount of washing water that is consumed and increasing washing efficiency. However, the discharge tip structure is problematic in that a certain amount of washing water is intermittently discharged, so that a user may feel pain due to the water pressure of the washing water and may feel uncomfortable.

Recently, in order to solve the problem, Korean U.M. Registration No. 20-0422546 related to a vibration device for a bidet nozzle has been proposed.

The vibration device for the bidet nozzle is advantageous in that a vibratory part is installed in a nozzle in which a flow path is folioed, so that the nozzle is vibrated while a vibratory member is rotated in response to a bidet button signal, thus discharging washing water and thereby increasing an area to be washed and making it easy to wash an associated part. However, the vibration device is problematic in that the vibratory part is integrally mounted inside the nozzle, so that the vibrating amplitude of the nozzle is small and washing power is low, and the vibratory member for generating vibration in the nozzle is orthogonally or perpendicularly mounted to a nozzle tube, so that it is difficult to provide large movement to the stream of water discharged through a wash hole.

DISCLOSURE

Technical Problem

Accordingly, the present disclosure has been made keeping in mind the above problems occurring in the related art, and an objective of the present disclosure is to provide a vibration nozzle for a bidet, in which a nozzle tip and a vibration motor are formed to be separate, so that the nozzle tip has maximized vibration efficiency, thus allowing a user's body part to be washed more cleanly.

Furthermore, another objective of the present disclosure is to provide a vibration nozzle for a bidet, in which a nozzle tip is coupled only to a part of the inside of the front end of a nozzle cover so as to reduce the size of the nozzle tip, thereby reducing manufacturing costs.

Furthermore, a further objective of the present disclosure is to provide a vibration nozzle for a bidet, in which washing-water supply tubes connected to a nozzle tip are arranged at both sides of a shaft of a vibration motor such that the diameter of a nozzle can be minimized and a structure for forming a separate water channel is unnecessary, and thus manufacturing costs can be remarkably reduced.

Technical Solution

In order to accomplish the above objectives, the present disclosure provides a vibration nozzle for a bidet, including a nozzle cover disposed to be movable forwards and backwards in a bidet body;

- a nozzle tip coupled to an inside of a front end of the nozzle cover to be separated from a vibration motor, thus discharging washing water;
- the vibration motor coupled to an inside of the nozzle cover to be spaced apart from the nozzle tip by a predetermined distance, and connected to the nozzle tip by a shaft to impart vibration to the nozzle tip;
- washing-water supply tubes coupled to connectors of the nozzle tip, respectively, and disposed on both sides of the shaft to supply washing water to a washing-water discharge hole and a bidet discharge hole;
- vibration-proof members coupled to a front end and a rear end of the vibration motor, respectively, and coming into close contact with an inner circumference of the nozzle cover while accommodating the supply tubes to prevent vibration from being transmitted by the vibration motor; and
- a closure cover coupled to a rear end of the nozzle cover so that the vibration motor is not detached from the nozzle cover.

The nozzle tip may include a body in which the washing-water discharge hole and the bidet discharge hole are formed respectively;

- a coupler formed on a rear end of the body so that the shaft of the vibration motor is coupled thereto; and
- the connectors formed on both sides of the coupler so that the washing-water supply tubes are connected thereto.

Each of the washing-water supply tubes may be formed of a flexible hose to selectively vary a position in which the washing-water supply tube is arranged.

Each of the vibration-proof members may have on a center thereof a through hole so that the shaft is located therein, and have accommodation spaces that communicate with both sides of the through hole to accommodate and support the washing-water supply tubes, respectively A step may be formed inside a front end of each of the washing-water supply tubes so that the washing-water supply tube is connected to the connector of the nozzle tip.

The closure cover may be opened at a center thereof to form a guide space so that each of the washing-water supply tubes is connected to an inside of the bidet, with a support piece being provided on a lower portion of the closure cover to come into close contact with a rear portion of each of the vibration-proof members and thereby support the vibration motor.

Advantageous Effects

A vibration nozzle for a bidet according to the present disclosure is advantageous in that a nozzle tip and a vibration motor are formed to be separate, so that the nozzle tip has maximized vibration efficiency, thus allowing a user's body part to be washed cleanly and thereby improving the reliability of a product.

Furthermore, a vibration nozzle for a bidet according to the present disclosure is advantageous in that a nozzle tip is coupled only to a part of the inside of the front end of a nozzle cover so as to reduce the size of the nozzle tip, thus reducing manufacturing costs and thereby securing economic efficiency.

Furthermore, a vibration nozzle for a bidet according to the present disclosure is advantageous in that washing-water supply tubes connected to a nozzle tip are arranged at both sides of a shaft of a vibration motor such that the diameter of a nozzle can be minimized and a structure for forming a separate water channel is unnecessary, and thus manufacturing costs can be remarkably reduced.

DESCRIPTION OF DRAWINGS

FIG. 1 is an exploded perspective view of the present disclosure.

FIG. 2 is a plan sectional view of the present disclosure.

FIG. 3 is a side sectional view of the present disclosure.

FIG. 4 is a front sectional view showing a state where washing-water supply tubes of the present disclosure are arranged at both sides of a vibration motor.

FIGS. 5 and 6 are diagrams showing the operational state of the present disclosure.

MODE FOR INVENTION

Hereinafter, an embodiment of the present disclosure will be described in detail with reference to the accompanying drawings.

FIG. 1 is an exploded perspective view of the present disclosure, FIG. 2 is a plan sectional view of the present disclosure, and FIG. 3 is a side sectional view of the present disclosure.

A vibration nozzle 100 for a bidet according to the present disclosure is composed of a nozzle cover 110, a nozzle tip 120, a vibration motor 130, washing-water supply tubes 140, vibration-proof members 150, and a closure cover 160, which will be described in detail below.

First, the nozzle cover 110 is formed to have a length accommodating the nozzle tip 120, the vibration motor 130, the washing-water supply tubes 140, and the vibration-proof members 150, and is preferably formed of a resin material or a stainless material.

Furthermore, the nozzle tip 120 is coupled to the front end of the nozzle cover 110, and is spaced apart from the vibration motor 130 coupled to a rear portion of the nozzle tip 120 by a predetermined distance.

The nozzle tip 120 is provided with a body 121 in which a washing-water discharge hole 121*a* and a bidet discharge hole 121*b* are formed respectively, and a coupler 122 protrudes from a center of a rear end of the body 121 so that a shaft 131 of the vibration motor 130 is coupled thereto.

Connectors 123 are formed on both sides of the coupler 122 to be connected to the washing-water supply tubes 140 and thereby supply washing water to the washing-water discharge hole 121*a* and the bidet discharge hole 121*b*.

Since the nozzle tip 120 is formed in a small size so that it is mounted not on the entire nozzle cover 110 but on a part of the front end thereof, manufacturing costs may be minimized.

Furthermore, the vibration motor 130 is coupled to the inside of the nozzle cover 110 to impart vibration to the nozzle tip 120.

The internal structure of the vibration motor 130 is the same as a conventional vibration motor, and is electrically connected to a controller of the bidet.

The vibration motor 130 is coupled to the rear portion of the nozzle tip 120 to be spaced apart from the nozzle tip 120 by a predetermined distance. An empty space is defined between the nozzle tip 120 and the vibration motor 130 so that there is no interference of any structure. The length of the empty space may be reduced or further extended to correspond to the length of the shaft 131.

The shaft 131 provided on the center of the vibration motor 130 is coupled to the coupler 122 formed on the rear end of the nozzle tip 120, and transmits vibration generated by the operation of the vibration motor 130 to the nozzle tip 120.

Furthermore, the washing-water supply tubes 140 are coupled to the connectors 123 formed on the nozzle tip 120.

Each washing-water supply tube 140 is formed of a flexible hose, so that the position of the water channel may be freely changed. A step 141 is formed inside the front end of each washing-water supply tube 140, thus making it easy to couple the washing-water supply tube with the connector 123.

The washing-water supply tubes 140 are connected to the connectors 123 formed on both sides of the coupler 122, so that the washing-water supply tubes are located on both sides of the shaft 131 of the vibration motor 130. The position of the washing-water supply tubes 140 may be changed according to the coupling number, and may be changed according to the installation direction of the vibration motor 130.

Therefore, since each washing-water supply tube 140 is formed of a hose, it is unnecessary to form a separate resin tube, thus minimizing manufacturing costs and varying the position of the water channel depending on a situation.

Furthermore, the soft vibration-proof members 150 are coupled to the front end and rear end of the vibration motor 130, respectively.

Each vibration-proof member 150 is in close contact between the vibration motor 130 and the nozzle cover 110, thus preventing vibration generated by the vibration motor 130 from being transmitted to the nozzle cover 110.

A through hole 151 opened to allow the shaft 131 to be coupled to the nozzle tip 120 is formed in the center of the vibration-proof member 150, and accommodation spaces 152 extend from both sides of the through hole 151 to accommodate and support the washing-water supply tubes 140, respectively.

The accommodation spaces 152 of the vibration-proof members 150 are preferably located on both sides of the vibration motor 130, and the direction of the accommodation spaces may be changed according to the arrangement position of the washing-water supply tubes 140.

Furthermore, the closure cover 160 is coupled to the rear end of the nozzle cover 110 so that the vibration motor 130 is not separated from the nozzle cover 110.

The closure cover 160 is shaped to be opened at a center thereof, the washing-water supply tube 140 is connected to the inside of the bidet in a guide space 161 that is opened as such, a support piece 162 formed on a lower portion of the closure cover 160 is in close contact with the rear portion of the vibration-proof member 150 coupled to the rear end of the vibration motor 130, so that the vibration motor 130 is firmly coupled so as not to be movable inside the nozzle cover 110.

As shown in FIGS. 5 and 6, the vibration nozzle 100 for the bidet of the present disclosure configured as such is operated as follows: if a wash button of the bidet controller is operated, washing water is supplied to the washing-water supply tube 140 connected to the washing-water discharge hole 121*a* among the washing-water supply tubes 140 disposed on both side of the shaft 131 through a water tank in the bidet, and simultaneously washing water is supplied to the washing-water discharge hole 121*a* of the nozzle tip 120.

In this case, the vibration motor 130 generates vibration at high speeds, and the shaft 131 is vibrated 60,000 times/second or more, thus transmitting vibration to the nozzle tip 120 that is spaced apart from the shaft by a predetermined distance.

Furthermore, the washing water fed to the nozzle tip 120 is discharged through the washing-water discharge hole 121*a* and simultaneously the washing water provides large movement by the vibration transmitted to the nozzle tip 120 to form fine particles and is dispersed in an S-shaped curve, thus allowing a user's parts to be more cleanly washed.

While the present disclosure has been particularly described with reference to exemplary embodiments shown in the drawings, terms or words used in the specification and claims should be interpreted as meanings and concepts consistent with the technical idea of the present disclosure without being limited to common or dictionary meanings.

Accordingly, since embodiments described in the specification and shown in the drawings are intended not to limit the technical idea of the disclosure, it will be understood by those of ordinary skill in the art that various changes and modifications may be made without departing from the spirit and scope of the present disclosure as defined by the appended claims.

The invention claimed is:

1. A vibration nozzle for a bidet, comprising: a nozzle cover disposed to be movable forwards and backwards in a bidet body;

a nozzle tip coupled to an inside of a front end of the nozzle cover to be separated from a vibration motor, thus discharging washing water;

the vibration motor coupled to an inside of the nozzle cover to be spaced apart from the nozzle tip by a predetermined distance, and connected to the nozzle tip by a shaft to impart vibration to the nozzle tip;

washing-water supply tubes coupled to connectors of the nozzle tip, respectively, and disposed on both sides of the shaft to supply washing water to a washing-water discharge hole and a bidet discharge hole;

vibration-proof members coupled to a front end and a rear end of the vibration motor, respectively, and coming into contact with an inner circumference of the nozzle cover to prevent vibration from being transmitted by the vibration motor, each of the vibration-proof members having on a center thereof a through hole so that the shaft is located therein, and having accommodation spaces' that communicate with both sides of the through hole to accommodate and support the washing-water supply tubes, respectively; and a closure cover coupled to a rear end of the nozzle cover so that the vibration motor is not detached from the nozzle cover.

2. The vibration nozzle of claim 1, wherein the nozzle tip comprises:

a body in which the washing-water discharge hole and the bidet discharge hole are formed respectively;

a coupler formed on a rear end of the body so that the shaft of the vibration motor is coupled thereto; and the connectors formed on both sides of the coupler so that the washing-water supply tubes are connected thereto.

3. The vibration nozzle of claim 1, wherein each of the washing-water supply tubes is formed of a flexible hose to selectively vary a position in which the washing-water supply tube is arranged.

4. The vibration nozzle of claim 1, wherein a step is formed inside a front end of each of the washing-water supply tubes so that the washing-water supply tube is connected to the connector of the nozzle tip.

5. The vibration nozzle of claim 1, wherein the closure cover is opened at a center thereof to form a guide space so that each of the washing-water supply tubes is connected to an inside of the bidet, with a support piece being provided on a lower portion of the closure cover to come into contact with a rear portion of each of the vibration-proof members and thereby support the vibration motor.

* * * * *